US008073926B2

(12) United States Patent
Traut et al.

(10) Patent No.: US 8,073,926 B2
(45) Date of Patent: Dec. 6, 2011

(54) VIRTUAL MACHINE IMAGE SERVER

(75) Inventors: Eric Traut, Bellevue, WA (US); Dan Teodosiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1611 days.

(21) Appl. No.: 11/031,133

(22) Filed: Jan. 7, 2005

(65) Prior Publication Data

US 2006/0155674 A1    Jul. 13, 2006

(51) Int. Cl.
 *G06F 15/16* (2006.01)
(52) U.S. Cl. ........ 709/217; 709/220; 717/171; 717/176; 718/1; 713/1
(58) Field of Classification Search .................. 709/203, 709/217, 219–222, 231, 220; 707/10, 204–205; 714/5; 713/1–2; 717/168–178; 718/1
 See application file for complete search history.

(56) References Cited

U.S. PATENT DOCUMENTS

| | | |
|---|---|---|
| 4,853,842 A | 8/1989 | Thatte et al. |
| 5,446,888 A | 8/1995 | Pyne |
| 5,486,826 A | 1/1996 | Remillard |
| 5,488,364 A | 1/1996 | Cole |
| 5,721,907 A | 2/1998 | Pyne |
| 5,933,104 A | 8/1999 | Kimura |
| 5,987,022 A | 11/1999 | Geiger et al. |
| 5,990,810 A | 11/1999 | Williams |
| 6,049,874 A | 4/2000 | McClain et al. |
| 6,061,733 A | 5/2000 | Bodin et al. |
| 6,101,507 A | 8/2000 | Cane et al. |
| 6,166,735 A | 12/2000 | Dom et al. |
| 6,226,629 B1 | 5/2001 | Cossock |
| 6,317,754 B1 | 11/2001 | Peng |
| 6,374,250 B2 | 4/2002 | Ajtai et al. |
| 6,377,974 B1 | 4/2002 | Feigenbaum |
| 6,381,709 B1 | 4/2002 | Casagrande et al. |
| 6,449,612 B1 | 9/2002 | Bradley et al. |
| 6,574,618 B2 * | 6/2003 | Eylon et al. ........................ 1/1 |

(Continued)

FOREIGN PATENT DOCUMENTS

EP    01587007    10/2005

(Continued)

OTHER PUBLICATIONS

Ajtai, M. et al., "Compactly Encoding Unstructured Inputs with Differential Compression", *Journals of the ACM*, 2002, 49(3), 318-367.

(Continued)

*Primary Examiner* — David Lazaro
(74) *Attorney, Agent, or Firm* — Woodcock Washburn LLP

(57) ABSTRACT

Virtual machine image files are stored in a virtual machine storage by a virtual machine image file server. Users at virtual machine clients connect to the virtual machine image file server and are presented with a list of the available virtual machine image files in a virtual machine image store. Users of the virtual machine clients are able to select the desired virtual machine image, and begin executing in the selected virtual machine environment as soon as the selected virtual machine image file begins downloading to the client computer. When a virtual machine image file is selected for storage it is divided into several segments. Each segment is compared with segments of previously stored virtual machine image files already in storage. For example, only non-duplicate segments are stored.

13 Claims, 5 Drawing Sheets

U.S. PATENT DOCUMENTS

| | | | |
|---|---|---|---|
| 6,574,657 B1 | 6/2003 | Dickinson | |
| 6,604,236 B1 | 8/2003 | Draper et al. | |
| 6,618,758 B1 | 9/2003 | Ubowski | |
| 6,651,249 B2 | 11/2003 | Waldin et al. | |
| 6,728,711 B2* | 4/2004 | Richard | 707/9 |
| 6,771,826 B2 | 8/2004 | Boon | |
| 6,772,302 B1 | 8/2004 | Thompson | |
| 6,791,982 B2 | 9/2004 | Westberg | |
| 6,819,271 B2 | 11/2004 | Geiger et al. | |
| 6,842,777 B1* | 1/2005 | Tuli | 709/217 |
| 6,938,045 B2 | 8/2005 | Li et al. | |
| 6,947,604 B2 | 9/2005 | Lippincott | |
| 6,952,823 B2 | 10/2005 | Kryloff et al. | |
| 6,963,923 B1 | 11/2005 | Bennett | |
| 7,003,554 B1 | 2/2006 | Turner et al. | |
| 7,054,912 B2 | 5/2006 | Kanai et al. | |
| 7,058,941 B1 | 6/2006 | Venkatesan et al. | |
| 7,099,884 B2 | 8/2006 | Gu | |
| 7,158,972 B2* | 1/2007 | Marsland | 707/10 |
| 7,318,073 B2 | 1/2008 | Shields et al. | |
| 7,334,023 B2 | 2/2008 | Koba et al. | |
| 7,353,355 B1* | 4/2008 | Tormasov et al. | 711/165 |
| 7,356,679 B1* | 4/2008 | Le et al. | 713/1 |
| 7,360,093 B2 | 4/2008 | de Queiroz | |
| 7,362,758 B2 | 4/2008 | Chang et al. | |
| 7,370,120 B2 | 5/2008 | Kirsch et al. | |
| 7,461,319 B2 | 12/2008 | Hanam et al. | |
| 7,477,166 B2 | 1/2009 | McCanne et al. | |
| 7,487,169 B2* | 2/2009 | Agarwal | 1/1 |
| 7,555,531 B2 | 6/2009 | Teodosiu et al. | |
| 2002/0083182 A1 | 6/2002 | Alvarado et al. | |
| 2002/0152219 A1 | 10/2002 | Garcia-Osuna et al. | |
| 2003/0046415 A1 | 3/2003 | Kaijyu et al. | |
| 2003/0061287 A1 | 3/2003 | Yu et al. | |
| 2003/0163506 A1* | 8/2003 | Dmitriev | 709/1 |
| 2004/0039716 A1 | 2/2004 | Thompson | |
| 2004/0054700 A1* | 3/2004 | Okada | 707/204 |
| 2004/0267836 A1 | 12/2004 | Armangau et al. | |
| 2005/0198303 A1* | 9/2005 | Knauerhase et al. | 709/227 |
| 2005/0256974 A1* | 11/2005 | Teodosiu et al. | 709/247 |
| 2005/0262167 A1 | 11/2005 | Teodosiu et al. | |
| 2006/0031547 A1* | 2/2006 | Tsui et al. | 709/231 |
| 2006/0041761 A1* | 2/2006 | Neumann et al. | 713/189 |
| 2006/0047716 A1 | 3/2006 | Keith | |
| 2006/0047855 A1 | 3/2006 | Gurevich et al. | |
| 2006/0064444 A1 | 3/2006 | van Ingen et al. | |
| 2006/0085561 A1 | 4/2006 | Manasse et al. | |
| 2006/0112113 A1 | 5/2006 | Gu et al. | |
| 2006/0155735 A1 | 7/2006 | Traut et al. | |
| 2006/0184652 A1 | 8/2006 | Teodosiu et al. | |
| 2007/0094348 A1 | 4/2007 | Scheidel et al. | |
| 2007/0162521 A1 | 7/2007 | Raghunath | |

FOREIGN PATENT DOCUMENTS

| | | |
|---|---|---|
| EP | 01641219 | 3/2006 |
| WO | WO 98/27483 | 6/1998 |
| WO | WO 98/35306 | 8/1998 |
| WO | WO 99/27460 | 6/1999 |
| WO | WO 01/54370 | 7/2001 |
| WO | WO 02/19653 | 3/2002 |
| WO | WO 02/41147 | 5/2002 |

OTHER PUBLICATIONS

Burns, R.C. et al., "A Linear Time, Constant Space Differencing Algorithm", *Department of Computer Science, University of California Santa Cruz*, 1997, 8 pages.

Randal C. Burns., "Differential Compression: A Generalized Solution for Binary Files", *University of California Santa Cruz*, Dec. 1996, 61 pages.

3wGet-Powerful HTTP/FTP Download Manager and Websites Downloader, http://www.popularshareware.com/3wGet-download-9099.html, 2 pages.

ActiveFile, http://www.15seconds.com/component/pg000024.htm, 2006, 4 pages.

Bjoner, N. et al., "Content-Dependent Chunking for Differential Compression, The Local Maxim Approach, "TR-2007-102, 1-93.

Border, A.Z., "Identifying and Filtering Near-Duplicate Documents," *Combinatorial Pattern Matching, 11th Annual Symposium*, CPM 2000, Montreal, Canada, Jun. 21-23, 2000, 13 pages.

Broder, A.Z., "On the Resemblance and Containment of Documents," *IEEE, 1997 Proceedings on Compression and Complexity of Sequence Conference*, Jun. 11-13, 1997, 11 pages.

Broder, A.Z., *Identifying and Filtering Near-Duplicate Documents*, Sequences 1997, 10 pages.

Burns, R. et al., "Efficient Distributed Backup with Delta Compression," *Proceedings of the Fifthe Workshop in I/O in Parallel and Distributed*, 1997, 27-36.

Chang et al., "Mimic: Raw Activity Shipping for File Synchronization in Mobile File Systems," ACM, 2004, 165-176.

Muthitacharoen et al., *Low-Bandwidth File System (LBFS)*, http://pdos.csail.mit.edu/papers/lbfs:sosp01/1bfs.pdf.

Suel, T. et al., "Improved File Synchronization Techniques for Maintaining Large Replicated Collections Over Slow Networks," *In Proceedings: IEEE 20 International Conference on Data Engineering*, Mar. 30-Apr. 2, 2004, 153-164.

Suel, T. et al., "Algorithms for Delta Compression and Remote File Synchronization," [suel,memon}@poly.edu *Academic Press*, Aug. 2002, 24 pages.

Teodosiu, D. et al., "Optimizing File Replication Over Limited-Bandwidth Networks Using Remote Differential Compression," Nov. 1, 2006, 1-16.

Tridgell, Andrew, *Rsync algorithm*, Nov. 9, 1998 (last viewed Oct. 11, 2006) http://www.infoscience.co.jp/technical/rsync/tec_report/index.html, 10 pages.

Tridgell, "The Rsync Algorithm," *The Australian National University*, Jun. 1996, 8 pages.

Tridgell, Andrew, *Rsync algorithm*, Jul. 21, 2000 (last viewed Oct. 11, 2006) http://olstrans.sourceforge.net/release/OLS2000-rsync/OLS2000-rsync.html, 27 pages.

Tridgell, "Efficient Algorithms for Sorting and Synchronization," Thesis—*The Australian National University*, Apr. 2000, 115 pages.

Trigell, A., "Efficient Algorithms for Sorting and Synchronization," Feb. 1999, 115 pages.

U.S. Appl. No. 11/544,485: Non-Final Rejection, dated Jun. 8, 2010.

Chien, S. et al., "Producing Satisfactory Solutions to Scheduling Problems: An Iterative Constraint Relaxation Approach," Jun. 13, 1994, p. 6.

Douglis, F. et al., "Application-Specific Delta-Encoding Via Resemblance Detection," *USENIX Annual Technical Conference*, 2003, 14 pages.

Eshghi, K., "Intrinsic References in Distributed Systems," *Hewlett-Packard Company*, 2002, 1-8.

File2Pack 2.0, Mental9Production, Dec. 24, 2005, http://www.freedomloadmanager.org/downloads/archiving_software, 4 pages.

Fisher, D., "Iterative Optimization and Simplification of Heirarchical Clusterings," TR CS95-01, Jan. 1996, 1-33.

Giancarlo, R. et al., "Combinatorial Pattern Matching," *11th Annual Symposium*, CPM 2000, 13 pages.

Hamilton, Dr. Jim et al., "Design and Implementation of a Storage Repository Using Commonality Factoring," *IEEE*, 2003, 6 pages.

Kotz et al., "I/O in Parallel and Distributed Systems," Mar. 1, 1998, (last viewed Mar. 14, 2007) 1-29, http://72.14.253.104/search?q=cache:OZiK_nQxc2sJ:www/cs/dart,pitj/edi/~dfk/papers.

Kozuck et al., "Efficient State Transfer for Internet Suspend/Resume," 2002, p. 5, Pure-Demand fetch.

Kulkarni, P. et al., "Redundancy Elimination Within Large Collection of Files," *USENIX Association*, Jun. 2004, 59-72.

Langford, J., "Mulitround Rsync," Jan. 31, 2001, 1-11.

Manber, U., "Finding Similar Files in a Large File System," University of Arizona Technical Report, TR-93-33, Oct. 1993, 11 pages.

Miyashita, K. et al., "Improving System Performance in Case-Based Iterative Optimization Through Knowledge Filtering," 1995, 6 pages.

Muthitacharoen et al., *Low-Bandwidth File System (LBFS)*, http://pdos.csail.mitedu/papers/lbfs:sosp01/lbfs.pdf, 2001.

Muthitacharoen et al., "A low-bandwidth network file system," *Proceedings of the Eighteenth ACM Symposium on Operating Systems Principles*, 2001, 174-187.

Riverst, R., "The MD4 Message-Digest Algorithm," MIT Laboratory for Computer Science and RSA Data Security, Inc., Apr. 1992, Network Working Group, RFC 1320, 20 pages.

Samba documentation, http://rsync.samba.org/documentation.html, (last viewed Oct. 11, 2006), 1 page.

ScriptUtilities and Huge ASP File Upload, http://www.motobit.com/help/asp-upload/upload.asp, 1996-2006, 5 pages.

Spring, N.T. et al., "A Protocol-Independent Technique for Eliminating Redundant Network Traffic," *Proceedings of the Conference on Applications, Technologies, Architectures, and Protocols for Computer Communications*, 2000, 87-95.

\* cited by examiner

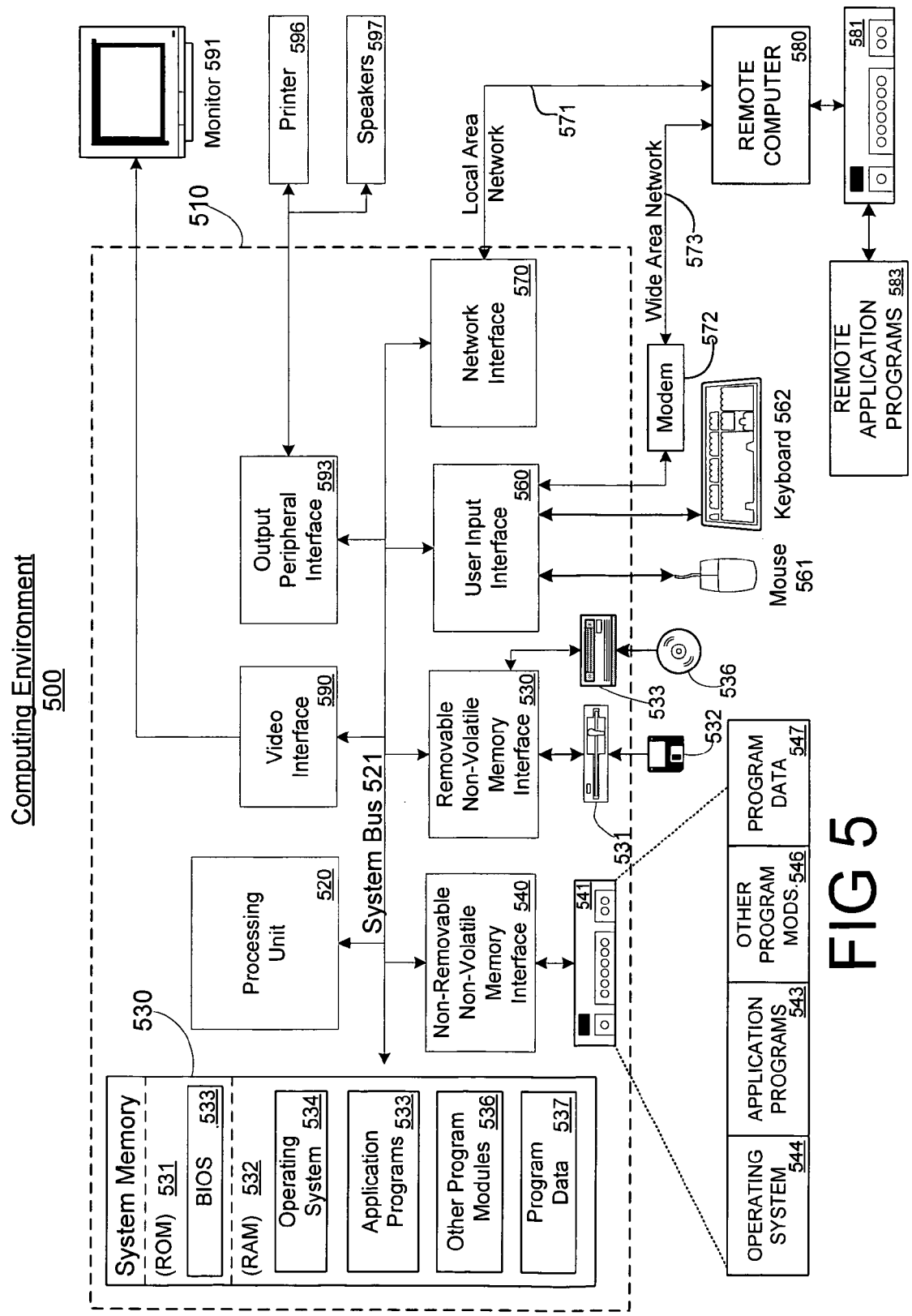

VIRTUAL MACHINE IMAGE SERVER

CROSS REFERENCE TO RELATED APPLICATIONS

This invention is related to the following pending U.S. Patent Applications: U.S. patent application Ser. No. 10/825,735, filed on Apr. 15, 2004, now U.S. Pat. No. 7,555,531, issued on Jun. 30, 2009, "EFFICIENT ALGORITHM AND PROTOCOL FOR REMOTE DIFFERENTIAL COMPRESSION"; U.S. patent application Ser. No. 10/844,893, filed on May 13, 2004, "EFFICIENT CHUNKING ALGORITHM"; U.S. patent application Ser. No. 10/844,906, filed on May 13, 2004, "EFFICIENT ALGORITHM AND PROTOCOL FOR REMOTE DIFFERENTIAL COMPRESSION ON A REMOTE DEVICE"; U.S. patent application Ser. No. 10/844,907, filed on May 13, 2004, "EFFICIENT ALGORITHM AND PROTOCOL FOR REMOTE DIFFERENTIAL COMPRESSION ON A LOCAL DEVICE"; and U.S. patent application Ser. No. 10/948,980, filed on Sep. 24, 2004, now U.S. Pat. No. 7,613,787, issued on Nov. 3, 2009, "EFFICIENT ALGORITHM AND PROTOCOL FOR FINDING CANDIDATE OBJECTS FOR REMOTE DIFFERENTIAL COMPRESSION". The invention is further related to the U.S. patent application Ser. No. 11/031,158, filed on Jan. 7, 2005, now U.S. Pat. No. 7,849,462, issued on Dec. 7, 2010, "IMAGE SERVER". The contents of the above applications are hereby incorporated by reference.

FIELD OF THE INVENTION

This invention relates to the field of virtual machines. More specifically this invention relates to system and methods for storing and serving virtual machine image files.

BACKGROUND OF THE INVENTION

Virtual machines enable a host computer to run multiple application environments or operating systems on the same computer simultaneously. The host computer allots a certain amount of the host's resources to each of the virtual machines. Each virtual machine is then able to use the allotted resources to execute applications, including operating systems. The virtual machine virtualizes the underlying hardware of the host computer or emulates hardware devices, making the use of the virtual machine transparent to the operating system or the user of the application. Typical virtual machines make use of virtual machine image files to store the desired application environment or operating system. One common type of virtual machine image file is the virtual hard drive ("VHD"). To the host system, a VHD is simply a large file that can be copied and backed up and to which standard file system permissions can be applied. To the virtual machine, the VHD file appears to be a full hard drive, and typically contains an operating system and a set of applications.

For modern operating systems, virtual machine image files can typically grow to several gigabytes in size. Because users or software developers often maintain several virtual image files or VHDs, maintaining and efficiently storing the virtual machine image files can be difficult. The problem becomes worse in large organizations where multiple users are independently maintaining their own image libraries. This results in large storage space requirements, even though these images typically share large amounts of common operating system or application code.

What is needed are fast and efficient systems and methods for the transfer and storage of virtual machine image files.

SUMMARY OF THE INVENTION

This invention allows users of virtual machines to compile and manage a repository of virtual machine image files for use within an organization. Virtual machine image files are stored in a virtual machine image store by a virtual machine image server. Users of virtual machine clients connect to the virtual machine image server and are presented with a list of the available virtual machine image files in the virtual machine image store. Users of the virtual machine clients are able to select the desired virtual machine image, and begin executing in the selected virtual machine environment as soon as the selected virtual machine image file begins downloading to the client computer.

Alternatively, if there are existing virtual machine image files stored at the virtual machine client, the virtual machine image server first determines the differences between the virtual machine files at the virtual machine client and the requested virtual machine image file by comparing signatures of segments comprising the virtual machine image files with the signatures of segments comprising the requested virtual machine image file. The virtual machine image server then sends only those segments that are different than the segments at the virtual machine client. The virtual machine client desirably constructs the requested virtual machine image from the stored and received segments.

The invention also addresses the issues related to efficiently storing and retrieving a large number of virtual machine image files. When a virtual machine image file is selected for storage it is divided into several segments. Each segment is compared with segments of previously stored virtual machine image files already in storage. Only non-duplicate segments are stored. In addition, a data structure is created and stored for the virtual machine image file identifying the segments comprising the stored virtual machine image file. When the stored virtual machine image file is later requested the data structure is retrieved and the virtual image file is reassembled from the segments as indicated in the data structure.

Furthermore, the invention addresses the issues related to updating virtual machine image files at virtual machine clients. When an update is made to a virtual machine image file at the virtual machine image server it is desirable that the update be propagated to virtual machine clients efficiently by reusing the virtual machine image files at the virtual machine clients. Signatures of the segments comprising the pre-update virtual machine image are compared with signatures of the segments comprising the post-update virtual machine image. Segments that are different are desirably sent to the virtual machine clients and substituted for the segments stored on the virtual machine clients and the updated virtual machine image files are constructed on the virtual machine clients from the stored and received segments.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 is a block diagram showing an exemplary computing environment in which aspects of the invention may be implemented.

DETAILED DESCRIPTION OF ILLUSTRATIVE EMBODIMENTS

Figure 1:
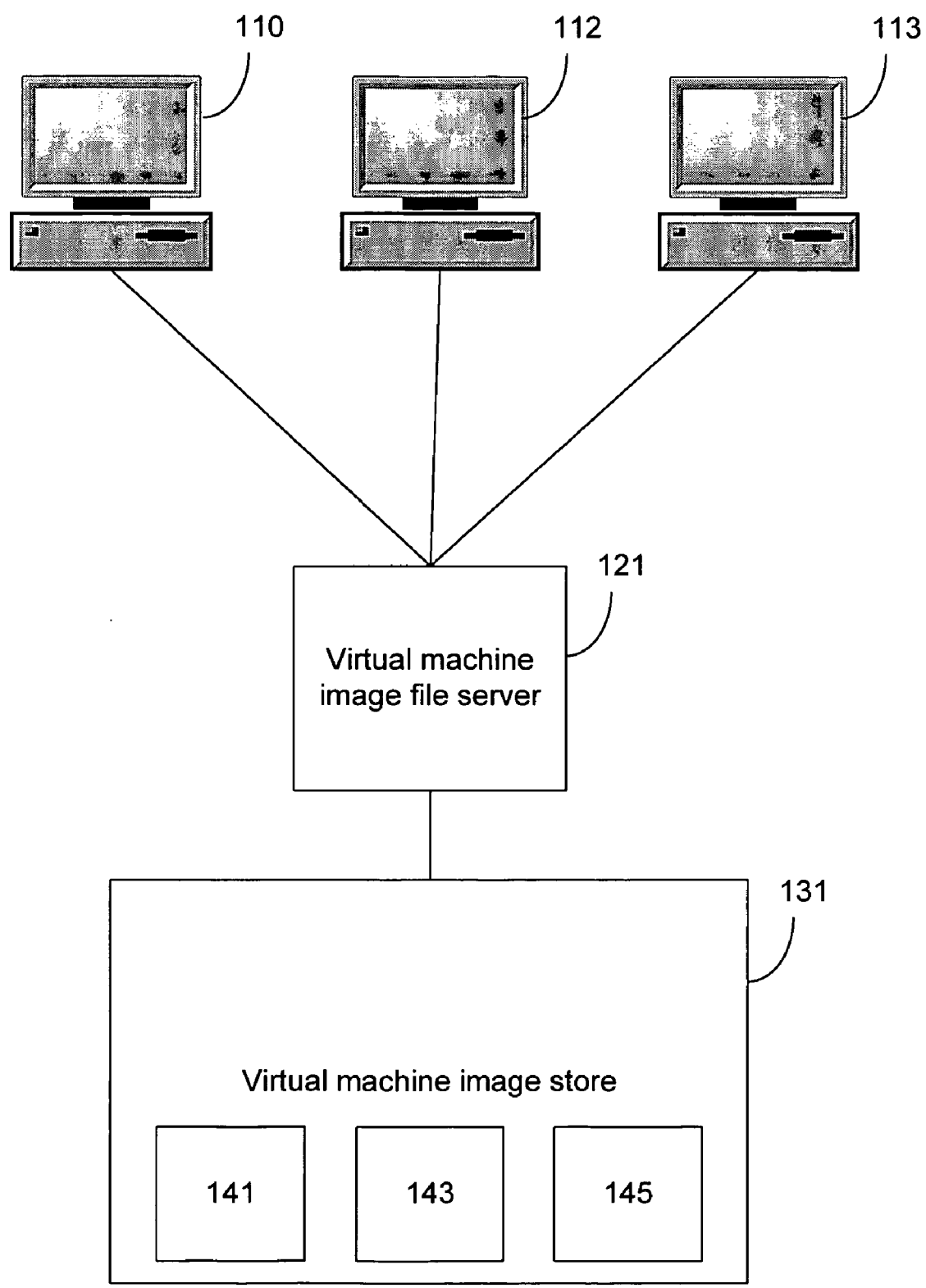
FIG. 1 is a block diagram illustrating an exemplary virtual machine image file server system in accordance with the present invention.

FIG. 1 is a block diagram illustrating an exemplary virtual machine image file server system in accordance with the present invention. The system comprises a plurality of virtual machine clients 110, 112, and 113, a virtual machine image server 121, a virtual machine image store 131, and a plurality of virtual machine image files 141, 143, and 145 comprised within the virtual machine image store 131. While FIG. 1 illustrates three virtual machine clients, it is not meant to limit the invention to three virtual machine clients. There is no limit to the number of virtual machine clients that can be supported. Similarly, there is no limit to the number of virtual machine image servers, virtual machine image stores, or virtual machine image files that can be supported.

One or more virtual machines are executed locally on a client computer, such as clients 110, 112, and 113, for example. Using virtual machines, clients 110, 112, and 113 are desirably able to operate in, and change between, a variety of operating systems and application environments simply by retrieving and loading one of virtual machine image files 141, 143, and 145. Each virtual machine image file 141, 143, and 145 desirably corresponds to a different operating system and application environment. Examples of virtual machine image files 141, 143, and 145 may include virtual hard drive files ("VHD"). Virtual machines may be executed using virtual machine configuration files ("VMC"). The VMC file desirably comprises the configuration data for the virtual machine; for example, what resources should be allocated to the virtual machine, and what VHDs may be associated with the virtual machine. The VMC file may not be necessary to configure the virtual machines; for example, the virtual machine may desirably be able to operate using a default virtual machine configuration, and may only require a VHD. The VMC file may be stored as an XML file, however any suitable format known in the art may be used.

The VHD file desirably comprises the operating system and application data that is executed by the virtual machine on the client devices 110, 112, and 113. When the virtual machine, as described in the VMC file, 'boots' into the operating system contained in the VHD file, the VHD file appears to the operating system as a physical hard drive with data stored in sectors. In addition, there may be multiple VHD files comprising a particular virtual machine image file 141, 143, and 145, with each VHD file appearing to the operating system as a separate hard drive.

While the embodiments disclosed herein describe virtual machine image files 141, 143, and 145 as comprising VHD files, it is for illustrative purposes only, and is not meant to limit the invention to virtual machine image files comprised only of VHD files. The invention is applicable to virtual machines configurations using any system, method or technique known in the art for representing and operating virtual machines.

The virtual machine image server 121 desirably controls the virtual machine image files 141, 143, and 145 available for use by the virtual machine clients 110, 112, and 113. The virtual machine image server 121 may be connected to the virtual machine clients by a local area network, or a wide area network, for example the Internet. The virtual machine image server 121 may operate on a single computer, or may be executed across multiple distributed computers, for example. The virtual machine image server 121 desirably communicates with the virtual machine clients 110, 112, and 113 using a standard high-level network protocol, for example HTTP, SMB or FTP. However, any system, method, or technique known in the art for networking may be used.

The virtual machine image server 121 is desirably connected to a virtual machine image store 131. The virtual machine image store 131 desirably comprises the virtual machine image files 141, 143, and 145 available for use by the clients 110, 112, and 113. As described further with respect to FIGS. 3 and 4, the virtual machine image files 141, 143, and 145 are desirably stored by dividing each file into segments, and desirably only storing segments that have not been previously stored in the virtual machine image store 131. However, the virtual machine image files 141, 143, and 145 can be stored using any system, method, or technique known in the art for data storage.

The virtual machine image store 131 may operate at a single computer, or node on a network; however, the virtual machine image store 131 may also be distributed across multiple computers or storage devices. The virtual server 131 may also operate at the same computer, or otherwise part of, the virtual machine image server 121.

The virtual machine clients 110, 112, and 113 desirably send requests for virtual machine image files 141, 143, and 145, such as VHDs for example, to the virtual machine image server 121. The virtual machine image server 121 desirably logs, or otherwise records requests for virtual machine image files. The virtual machine clients 110, 112, and 113 may automatically detect all the virtual machine image servers 121 available on the network, for example.

Each virtual machine image file 141, 143, and 145 may be stored with associated meta-information. This meta-information may be used by virtual machine clients 110, 112, and 113 to determine which of the virtual machine image files 141, 143, and 145 to select for use. Users of virtual machine clients are desirably able to sort or search the available virtual machine image files 141, 143, and 145 using the associated meta-information.

The requests for virtual machine image files 141, 143, and 145 may be generated automatically by the virtual machine clients 110, 112, and 113, as part of a boot process. For example, in an office environment where frequent updates are made to the operating systems and applications on computers used by workers, it may be difficult to keep each worker's system up to date. Accordingly, each of the worker computers (virtual machine clients 110, 112, and 113) may execute a virtual machine, with the virtual machine configured to retrieve a particular VHD (one of virtual machine image files 141, 143, and 145) residing on the virtual machine image server 121 at startup. When an update to the worker computers are required, such as a operating system patch for example, the system administrator need only apply the patch to the VHD on the virtual machine image server 121. The next time the workers turn on their computers, they will desirably boot into the updated VHD file.

In an alternative embodiment, each worker desirably boots from a VHD file stored locally at each of the virtual machine clients 110, 112, and 113. The virtual machine image server 121 desirably maintains a list of each virtual machine client 110, 112, and 113, and their corresponding VHD file or files. After a user or administrator makes a change to one of the stored VHD files, each virtual machine client 110, 112, and 113 that uses one of the affected VHD files is desirably notified that a change has been made, and an updated VHD should be retrieved and stored. Alternatively, each of the virtual machine clients 110, 112, and 113 may periodically poll the virtual machine image server 121 to determine if there has been an update to one of their corresponding VHDs. The virtual machine image server 121 may automatically update the stored VHD files on the virtual machine clients 110, 112, and 113 without user intervention.

Alternatively, network bandwidth can be preserved by updating the stored VHDs at the virtual machine clients 110, 112, and 113 using remote differential compression ("RDC") as described in pending U.S. patent application Ser. Nos. 10/844,893, 10/844,906, 10/844,907, and 10/984,980. It is highly likely that the updated VHD and stored VHD on the virtual machine clients 110, 112, and 113 contain a large amount of duplicate data. The updated VHD and stored VHD are desirably divided into segments. Signatures are desirably computed for each of the segments. The signatures of the stored VHD segments are desirably compared using RDC with the signatures of the updated VHD segments. Network bandwidth may be conserved by only transmitting the segments of the updated VHD that are different from the segments of the VHD stored in the virtual machine clients 110, 112, and 113, for example. The preexisting virtual machine images may be selected by the virtual machine client using the similarity detection approach as described in U.S. patent application Ser. No. 10/825,735; however, any system, method or technique known in the art may be used.

Developers may also use the virtual machine image server 121. For example, a user or development team may be programming an application. In order to test the application in a variety of user environments and operating systems, the users or developers may need to quickly switch between operating system environments. Accordingly, the user or development team desirably stores in virtual machine image store 131 a plurality of virtual machine image files, each virtual machine image file desirably corresponding to an operating system environment that they may desire to test the application in. When the users or developers desire to load a particular operating system on one oaf the virtual machine clients 110, 112, and 113, the users desirably connect to the virtual machine image server 121. The users are then desirably presented with a list of the available virtual machine image files at virtual machine store 131. Alternatively, the users may be presented with meta-information associated with the virtual machine image file. The users can then select one of the stored virtual machine image files, and the selected virtual machine image file immediately begins to download to one of the virtual machine clients 110, 113, and 113. The virtual machine image file is desirably downloaded using the method as described further with respect to FIG. 2, for example, allowing for the virtual machine clients 110, 112, and 113 to begin executing in the selected environment before the virtual machine image file has finished downloading.

Alternatively, network bandwidth can be preserved by transferring the selected virtual machine image file using RDC. There may be one or more preexisting virtual machine images stored at one of the virtual machine clients 110, 112, and 113. These preexisting virtual machine images may share segments with the selected virtual machine image at virtual machine store 131. Network bandwidth may be conserved by only transmitting the segments of the selected virtual machine image that are different from the segments in the preexisting virtual machine images, for example.

In another embodiment of the present invention, the virtual machine image store 131, instead of storing virtual machine image files corresponding to a variety of operating system and application environments, stores virtual machine configuration file templates corresponding to a variety of operating system and application environments. These templates are then desirably used by the virtual machine image server 121 to generate a virtual machine image file corresponding to the requested operating system and application environment requested by the virtual machine clients 110, 112, and 113.

For example, one of virtual machine clients 110, 112, and 113 desirably sends a request to the virtual machine image server 121. The request desirably includes a parameter corresponding to the requested operating system, and another parameter corresponding to a requested application environment. The virtual machine image server 121 desirably retrieves a template corresponding to the received parameters and generates a virtual machine image file based on the received parameters. The generated virtual machine image file may be downloaded using RDC or a method as described with respect to FIG. 2, for example. Once the generated virtual machine image file has been downloaded it is desirably discarded by the virtual machine image server 121.

Figure 2:
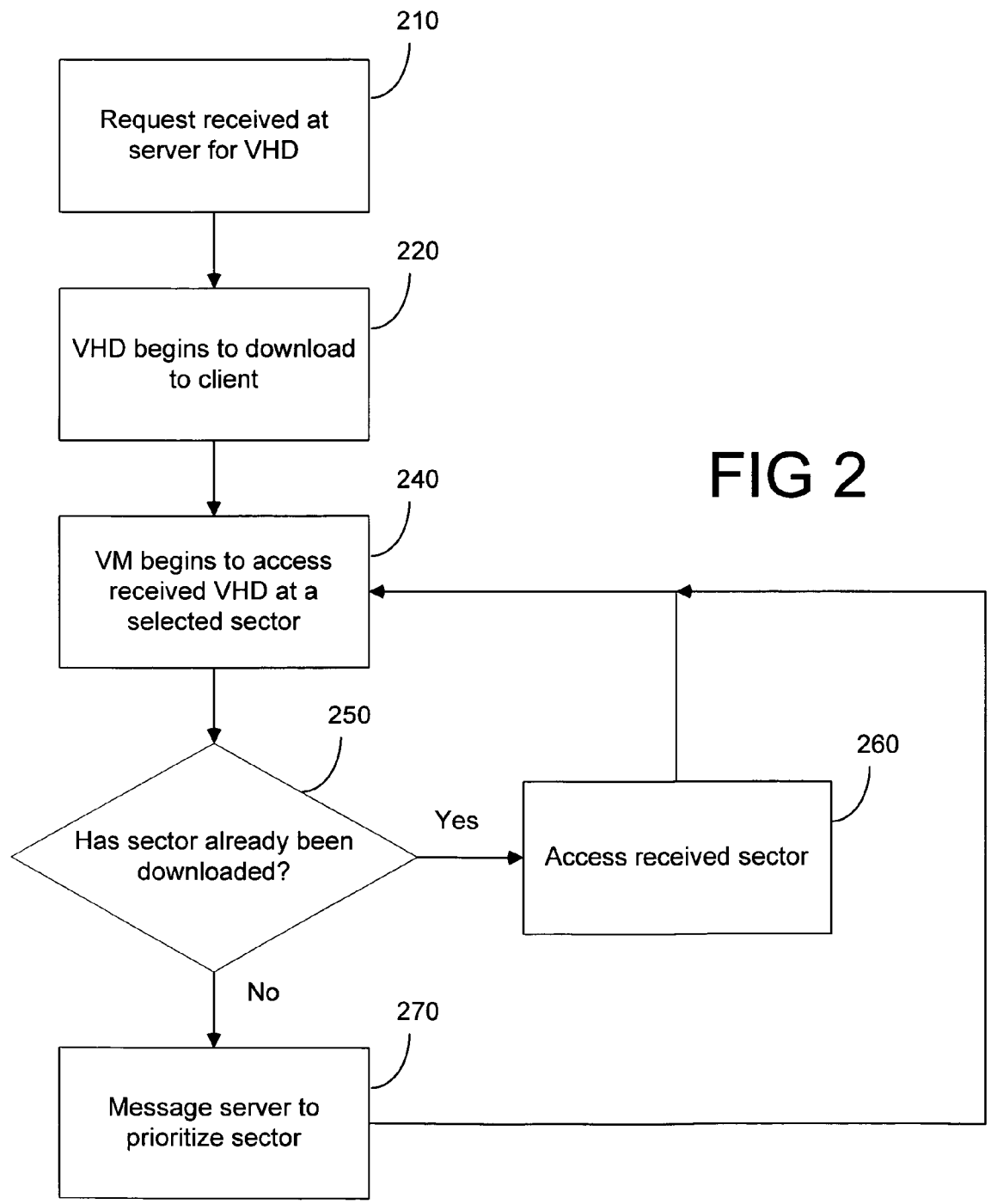
FIG. 2 is a flow diagram illustrating an exemplary method for transmitting a virtual machine image file in accordance with the present invention.

FIG. 2 is a flow diagram illustrating an exemplary method for transmitting a virtual machine image file in accordance with the present invention. A request is received for a particular virtual machine image file, for example a VHD. The VHD file begins to download to the client as a background operation at the client device. The virtual machine begins to "boot" from the partially downloaded VHD file. The virtual machine attempts to access a particular sector on the VHD. If the sector is available (i.e., it has been downloaded), the sector is accessed. If the sector is not available (i.e., it has not been downloaded), the background application sends a message to the VHD server to fast track the needed sector. The VHD server receives the request to fast track and prioritizes the requested sector. After receiving the requested sector, the virtual machine continues accesses the received sector. While FIG. 2 is described with respect to VHD files, the method described applies equally to any other type of virtual machine image file or virtual machine configurations known in the art.

At 210, a request is desirably received for a VHD. The request may have been sent by a client computer device and received by a virtual machine image server, as described with respect to FIG. 1, for example. A user may have selected the desired VHD from a list of VHDs available on the VHD server, or the VHD request may have occurred automatically when the client computer was started, for example. If the requested VHD is not available on the VHD server, an error message is desirably generated to the client device. Otherwise, the VHD file is desirably prepared for downloading.

At 220, the VHD file desirably begins to download to the requesting client. As described further with respect to FIGS. 3 and 4, the VHD file may be stored divided into several pieces or segments. The segments comprising the VHD file are desirably located and added to a transmittal queue for delivery to the requesting client device. The segments are desirably added to the transmittal queue in the order that they appear in the VHD file.

Alternatively, the VHD file may be downloaded using RDC. Any VHD files already present at the requesting client device are first checked to determine if there are segments that are duplicates of the segments comprising the requested VHD. Only non-duplicate segments are desirably added to the transmittal queue.

Once in the transmittal queue, the segments desirably begin downloading to the requesting client. The segments may be further divided into smaller pieces for transmittal, depending on the capabilities of the network and the underlying transfer protocol used. The VHD file is desirably downloaded from the virtual machine image server to the client by a separate background process, such that the virtual machine executing on the client computer is desirably not aware that the entire VHD file may not have been downloaded. Any system, method, or technique known in the art for transferring files may be used such as RDC, for example. The segments in the transmittal queue are desirably downloaded in the order that they were added to the queue.

At 240, the virtual machine desirably attempts to access a sector of the VHD. The virtual machine executing at the client device desirably attempts to boot from, or otherwise use, the requested VHD that is downloading to the client device from the virtual machine image server. To an application or operating system executing on the virtual machine, the VHD file appears as a physical hard drive. The bytes comprising the VHD file correspond to sectors on a physical hard drive.

At 250, the client computer desirably determines if the desired sector has already been downloaded. Before the sector can be retrieved from the VHD file, the background process, as described above, desirably determines if the portion of the VHD that contains the requested sector has been downloaded to the client computer. Associated with each VHD file may be a list of the sectors of the hard drive, and the corresponding locations of those sectors in the VHD file. Alternatively, there may exist a formula that translates a requested sector number into a location in the VHD file. Any system, method, or technique known in the art for determining if a requested portion of a file has been may be used. If it is determined that the requested sector has been downloaded the embodiment desirably continues at 260. Else, the embodiment continues at 270.

At 260, it has been determined that the requested sector has been downloaded. The requested sector is desirably retrieved and accessed by the virtual machine. The background process desirably continues to download the remaining portions of the VHD file from the virtual machine image server, and any further requests for sectors by the virtual machine are desirably handled at 240.

At 270, it has been determined that the requested sector has not been downloaded. The background process desirably sends a message to, or contacts the virtual machine image server to prioritize the requested sector in the transmittal queue. As described previously, the VHD file is downloaded by the background process from the transmittal queue located at the virtual machine image server. Because a predetermined transmittal order is used for all sectors, such as sequential for example, and sectors are typically accessed randomly by applications, a requested sector may not be downloaded when needed.

When the request to prioritize the requested sector is received by the virtual machine image server, the virtual machine image server desirably locates the segment containing the requested sector in the transmittal queue, and moves the segment to the front of the queue. After the requested sector has been downloaded to the client, the background process desirably allows access to the requested sector. The background process desirably continues to download the remaining portions of the VHD file from the virtual machine image server, and any further requests for sectors by the virtual machine are desirably handled at 240.

Figure 3:
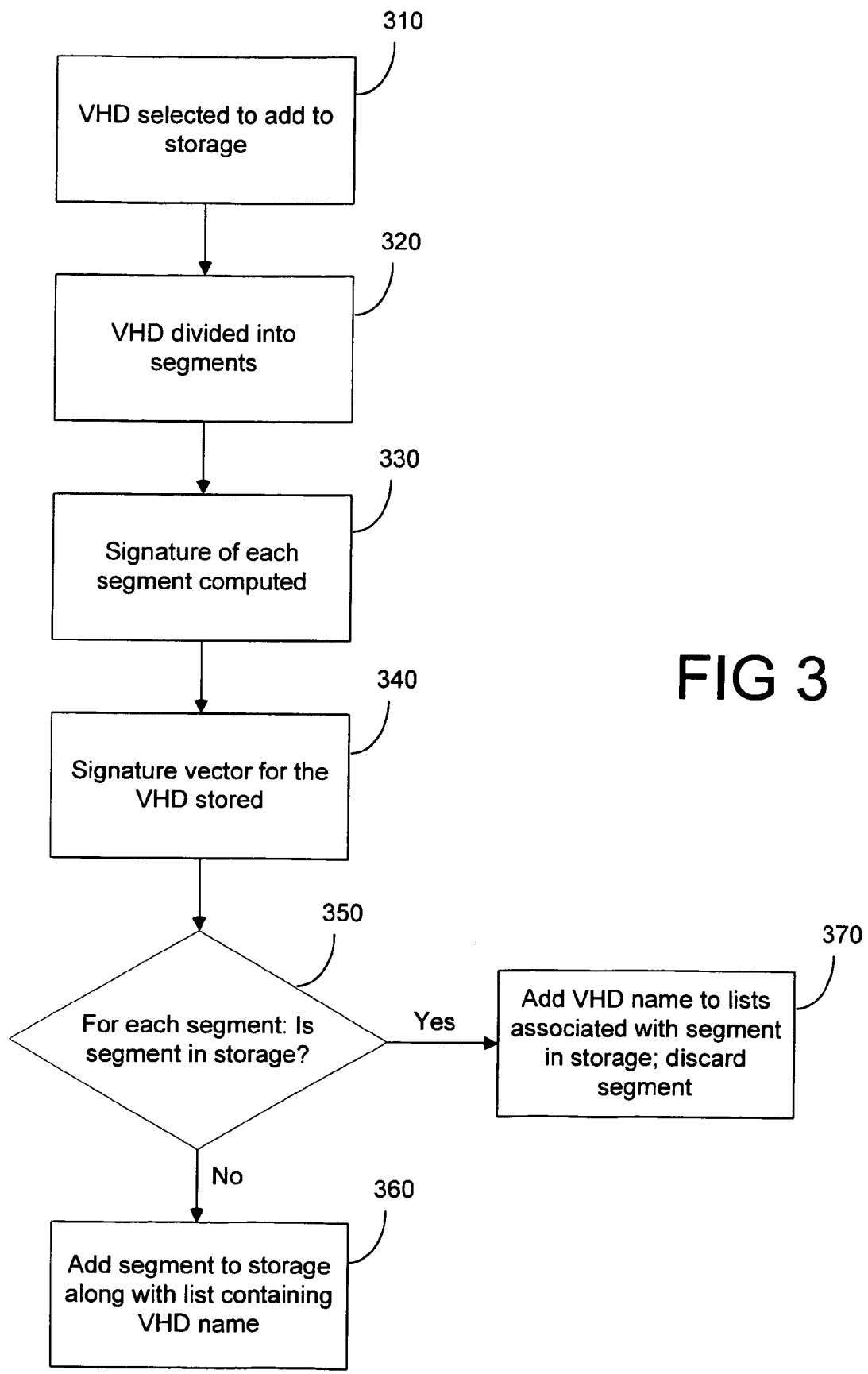
FIG. 3 is a flow diagram illustrating an exemplary method for storing a virtual machine image file in accordance with the present invention.

FIG. 3 is a flow diagram illustrating an exemplary method for storing virtual machine image files, for example VHDs, in accordance with the present invention. A VHD is selected to add to storage. The VHD is divided into segments. A signature, or hash, is computed for each segment based on the contents. The computed signatures are stored together in a data structure corresponding to the VHD. For each segment that is already in storage, the name of the VHD is appended to a list of VHDs associated with that segment. For each segment that is not in storage, the segment is added to the storage along with a list containing the name of the current VHD. While FIG. 3 is described with reference to VHD files only, it is not meant to limit the invention to storing VHD files. The method described below can be used to store any other type of virtual machine image file known in the art.

At 310, a VHD is desirably selected for storage. Each VHD may represent a hard drive comprising a particular operating system and application configuration. The VHD desirably allows a user at a client computer to quickly switch between operating system configurations using a virtual machine. In order to facilitate access to a larger number of VHDs by a large number of users, the VHDs are desirably stored together. A user or system administrator desirably selects the VHD file to store and provides it to the server using any system, technique, or system known in the art for transferring data such as through a network, or using a portable storage medium, for example.

At 320, the VHD is desirably divided into segments. The VHD may be divided into segments according to the method as described in pending U.S. patent application Ser. Nos. 10/844,893, 10/844,906, and 10/844,907, for example. However, any system, method or technique known in the art for segmenting a large data file can be used. Dividing the VHD into segments allows the server to conserve storage space by desirably storing any given segment only once. The average sizes of the segments are desirably chosen by a user or administrator. For example, it may be desirable that segments comprising the first sectors of the VHD be larger on average than segments comprising the end of the VHD. For example, the first sectors of the VHD are more likely to comprise the operating system data, and are therefore more likely to be duplicates of sectors found in another VHD. In contrast, because the sectors found at the end of the VHD file are more likely to comprise application data, it is less likely that a large segment will match any of the segments already in storage. Any system, technique, or method known in the art for determining an optimal segment size can be used.

At 330, a signature is desirably computed for each segment. As described above, each segment is desirably compared with stored segments to avoid duplicate storage of segments. In order to avoid comparing segments byte by byte, a signature corresponding to each segment is desirably compared instead. The signature is desirably computed using a cryptographically secure hash function with a low probability of collision, such as SHA-1 for example. However, any system, method, or technique known in the art for computing a hash function may be used. The resulting signatures are desirably smaller then their corresponding segment, and therefore require significantly less overhead to compare with other signatures.

At 340, a signature vector for the VHD is desirably stored. As described above, each segment is desirably only stored if it is not a duplicate of a segment already found in storage.

Instead of storing the entire VHD, a vector comprising the signature of each VHD is desirably stored instead. The vector is desirably represented as an array comprising the signatures for each segment in the order that they appear in the associated VHD. However, the signature vector can be represented using any suitable data structure known in the art, such as a linked list for example.

At 350, the storage is desirably searched for each of the segments. In order to determine which segments are not already comprised in storage and may therefore be added to storage, the storage is desirably searched for each segment using the computed signatures. Any system, method, or technique known in the art for searching for signatures may be used.

If a segment is not found in the storage it is desirably added to the storage, along with its signature and a list containing the name of the VHD that the segment belongs to at 360.

If a segment is found in the storage, the name or identifier of the current VHD is desirably appended to a list of VHDs that the segment is found in, and the segment is desirably discarded at 370.

Figure 4:
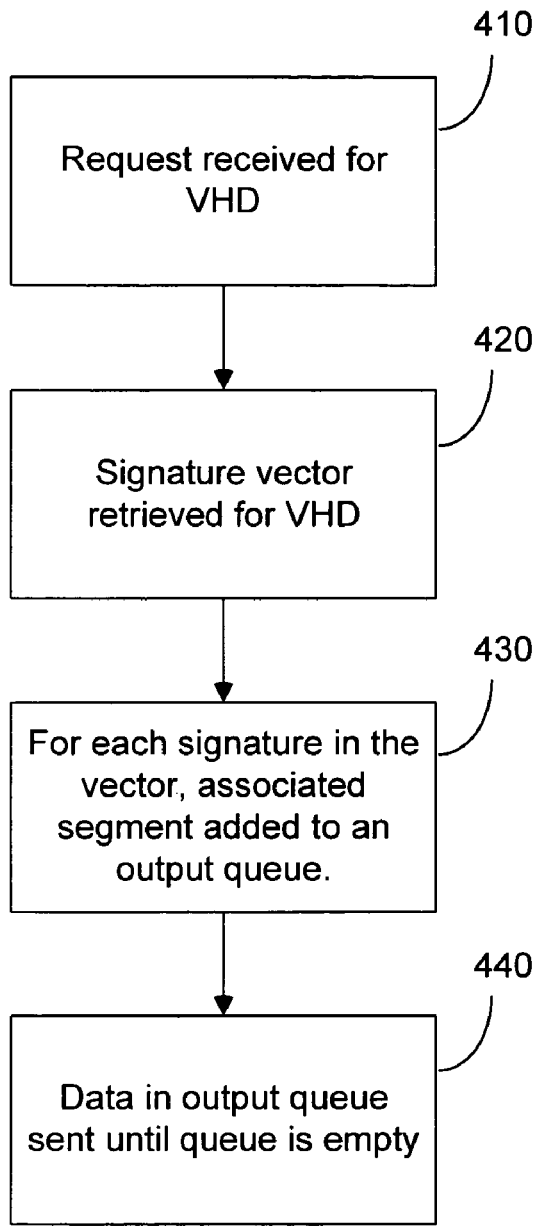
FIG. 4 is a flow diagram illustrating an exemplary method for retrieving a stored virtual machine image file in accordance with the present invention.

FIG. 4 is a flow diagram illustrating an exemplary method for retrieving a stored virtual machine image file, for example a VHD, in accordance with the present invention. A request for a VHD is received by the VHD server from a virtual machine client. An associated signature vector is retrieved for the requested VHD. For each signature listed in the vector, the associated segment is retrieved from storage and added to an output queue. Data in the output queue is transmitted to the requesting party until it is empty. While FIG. 4 is described with reference to VHD files only, it is not meant to limit the invention to retrieving stored VHD files only. The method described below can be used to any other type of virtual machine image file known in the art.

At 410, a request is desirably received for a VHD. The request may be received from a virtual machine client. The request may be made using a common high level network protocol such as HTTP, SMB or FTP, for example. Any system, method, or technique known in the art for sending requests over a network may be used.

At 420, the signature vector corresponding to the requested VHD is desirably retrieved. As described with respect to FIG. 3, each VHD is desirably stored as a signature vector, with each signature in the vector corresponding to a stored segment, or portion of the VHD. If a signature vector matching the requested VHD cannot be retrieved, then an error message is desirably generated. Else, the signature vector is desirably retrieved from storage.

At 430, for each signature comprised in the signature vector, the corresponding segment is desirably retrieved and added to an output queue. As described further with respect to FIG. 3, the signature vector comprises the signature for each of the segments comprising the requested VHD. The signature vector desirably stores the signatures corresponding to the order that the segments are arranged in the VHD. Accordingly, the signature vector is evaluated sequentially starting with the first signature in the vector. As each signature in the vector is evaluated, the corresponding segment is desirably retrieved from storage and added to the output queue. The segments may be stored in the same server as the signature vectors, or the segments may be stored separately at one or more storage devices.

Alternatively, as described previously with respect to FIG. 1, there may be additional VHDs stored at the requesting virtual machine client. Each of the additional VHDs may have segments that have the same signature as segments in the requested VHD. Network bandwidth may be conserved by only adding segments to the output queue that are not duplicates of the segments found in VHDs stored at the requesting virtual machine client. This method is described further in pending U.S. patent application Ser. No. 10/948,980.

At 440, the data in the output queue is desirably transmitted until the queue is empty. The data in the output queue is desirably transmitted to the originator of the original request for the VHD. The data can be transmitted using any system, technique, or method known in the art for transmitting data, such as RDC for example. Alternatively, the data in the output queue may be written to a portable medium, such as a DVD for example.

Exemplary Computing Environment

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 5 10. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 583 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for downloading a virtual machine image file to a virtual machine client, comprising:
   selecting by the virtual machine client the virtual machine image file, wherein the selecting comprises selecting a first parameter identifying an operating system, and a second parameter identifying an application environment;
   receiving the selected virtual machine image file at the virtual machine client from a virtual machine image file server; and
   executing the virtual machine image file at the virtual machine client before the virtual machine image file has been completely received by the virtual machine client, wherein the executing comprises:
      receiving a request to access a sector of the virtual machine image file by the virtual machine client;
      determining if the requested sector has already been received by the virtual machine client;
      accessing the requested sector when it is determined that the requested sector has previously been received by the virtual machine client; and
      sending a message to the virtual machine image file server to prioritize the requested sector when it is determined that the requested sector has not previously been received by the virtual machine client, and then accessing the requested sector when the requested sector is later received by the virtual machine client.

2. The method of claim 1, wherein retrieving the selected virtual image comprises the virtual machine image file server generating a virtual machine image file using the first and second parameters.

3. The method of claim 2, wherein the virtual machine image file is generated using a stored virtual machine image file configuration template corresponding to the first and second parameters.

4. The method of claim 1, wherein the virtual machine image file is selected from a plurality of virtual machine image files stored on the virtual machine image file server.

5. The method of claim 4, wherein selecting a virtual machine image file at the virtual machine client comprises:
   receiving meta-information associated with the plurality of virtual machine image files; and
   selecting the virtual machine image file using the received meta-information.

6. The method of claim 1, wherein the sectors are received using remote differential compression.

7. A virtual machine client comprising:
   a processor operative to execute computer-executable instructions; and
   memory having stored therein computer-executable instructions for performing steps comprising:
      select a virtual machine image file for transfer from a virtual machine image file server, and
      execute the virtual machine image file before the virtual machine image file has completely transferred to the virtual machine client from the virtual machine image file server, wherein the executing comprises:
         receiving a request to access a sector of the virtual machine image file by the virtual machine client;
         determining if the requested sector has already been transferred to the virtual machine client;
         accessing the requested sector when it is determined that the requested sector has previously been transferred to the virtual machine client; and
         sending a message to the virtual machine image file server to prioritize the requested sector when it is determined that the requested sector has not previously been transferred to the virtual machine client, and then accessing the requested sector when the requested sector is later transferred to the virtual machine client.

8. The virtual machine client of claim 7, wherein the virtual machine image file is transferred using remote differential compression.

9. The virtual machine client of claim 7, wherein the virtual machine client is adapted to select a first parameter identifying an operating system, and a second parameter identifying an application environment.

10. The virtual machine client of claim 7, wherein the virtual machine image file is selected by the virtual machine client from a plurality of virtual machine image files stored on the virtual machine image server.

11. The virtual machine client of claim 7, wherein the virtual machine image file is selected by the virtual machine client at startup.

12. The virtual machine client of claim 7, wherein the virtual machine client is adapted to detect virtual machine image file servers on a network.

13. A computer-readable storage medium with computer-executable instructions stored thereon for performing the method of:
   select a virtual machine image file for transfer from a virtual machine image file server, and
   execute the virtual machine image file before the virtual machine image file has completely transferred to a virtual machine client from the virtual machine image file server, wherein the executing comprises:
      receiving a request to access a sector of the virtual machine image file by the virtual machine client;
      determining if the requested sector has already been transferred to the virtual machine client;
      accessing the requested sector when it is determined that the requested sector has previously been transferred to the virtual machine client; and
      sending a message to the virtual machine image file server to prioritize the requested sector when it is determined that the requested sector has not previously been transferred to the virtual machine client, and then accessing the requested sector when the requested sector is later transferred to the virtual machine client.

* * * * *